(12) United States Patent
Li et al.

(10) Patent No.: US 12,410,695 B2
(45) Date of Patent: Sep. 9, 2025

(54) TURBINE FRACTURING EQUIPMENT

(71) Applicant: YANTAI JEREH PETROLEUM EQUIPMENT & TECHNOLOGIES CO., LTD., Shandong (CN)

(72) Inventors: Shuwei Li, Shandong (CN); Zhuqing Mao, Shandong (CN); Lutao Zheng, Shandong (CN); Xiuli Song, Shandong (CN); Shuang Li, Shandong (CN); Liang Li, Shandong (CN); Zhenmeng Wang, Shandong (CN); Rikui Zhang, Shandong (CN); Yipeng Wu, Shandong (CN); Chunqiang Lan, Shandong (CN); Xincheng Li, Shandong (CN); Xiance Li, Shandong (CN); Sheng Chang, Shandong (CN); Xiaolei Ji, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 94 days.

(21) Appl. No.: 18/456,223

(22) Filed: Aug. 25, 2023

(65) Prior Publication Data
US 2023/0400018 A1      Dec. 14, 2023

Related U.S. Application Data

(63) Continuation-in-part of application No. 17/531,817, filed on Nov. 22, 2021, now Pat. No. 11,788,519.
(Continued)

(30) Foreign Application Priority Data

Sep. 20, 2019   (CN) .......................... 201910894253.0

(51) Int. Cl.
*E21B 43/26* (2006.01)
*B62D 63/06* (2006.01)
(Continued)

(52) U.S. Cl.
CPC ........ *E21B 43/2607* (2020.05); *B62D 63/068* (2013.01); *F01D 25/30* (2013.01);
(Continued)

(58) Field of Classification Search
CPC ...... E21B 43/2607; F04B 47/02; F04B 17/06; B62D 63/068
See application file for complete search history.

(56) References Cited

U.S. PATENT DOCUMENTS 2,988,153 A    6/1961   Haworth et al.
3,418,485 A   12/1968   Anderson et al.
(Continued)

FOREIGN PATENT DOCUMENTS

CA        2944968         8/2016
CN        2625578 Y       7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
International Search Report, dated Jun. 5, 2020, pp. 1-4, issued in International Patent Application No. PCT/CN2019/107020, China Intellectual Property Administration, Beijing, China.
(Continued)

*Primary Examiner* — Shane Bomar
(74) *Attorney, Agent, or Firm* — Crowell & Moring LLP

(57) ABSTRACT

The present invention may disclose a turbine fracturing equipment, including a transporter, a turbine engine, a reduction gearbox, a transmission mechanism and a plunger pump, wherein an output end of the turbine engine may be connected to one end of the reduction gearbox, the other end of the reduction gearbox may be connected to the plunger pump through a transmission mechanism; the transporter may be used to support the turbine engine, the reduction gearbox, the transmission mechanism and the plunger pump; the transporter may include a chassis provided with a
(Continued)

transport section, a bearing section and a lapping section which may be connected in sequence; while the turbine fracturing equipment may be in a working state, the bearing section can contact with the ground, while the turbine fracturing equipment may be in a transport state, the bearing section may not contact with the ground.

18 Claims, 4 Drawing Sheets

Related U.S. Application Data which is a continuation of application No. 16/832,191, filed on Mar. 27, 2020, now Pat. No. 11,242,737.

(51) Int. Cl.
| | |
|---|---|
| F01D 25/30 | (2006.01) |
| F04B 15/02 | (2006.01) |
| F04B 17/05 | (2006.01) |
| F04B 17/06 | (2006.01) |
| F04B 53/08 | (2006.01) |
| B62D 33/08 | (2006.01) |
| B62D 61/10 | (2006.01) |

(52) U.S. Cl.
CPC ............ *F04B 15/02* (2013.01); *F04B 17/05* (2013.01); *F04B 17/06* (2013.01); *F04B 53/08* (2013.01); *B62D 33/08* (2013.01); *B62D 61/10* (2013.01); *F05D 2260/96* (2013.01)

(56) References Cited

U.S. PATENT DOCUMENTS

| | | | |
|---|---|---|---|
| 3,791,682 | A | 2/1974 | Mitchell |
| 3,881,841 | A | 5/1975 | Straniti |
| 4,341,071 | A | 7/1982 | Abo et al. |
| 5,435,975 | A | 7/1995 | Bastos |
| 5,517,822 | A | 5/1996 | Haws et al. |
| 5,709,076 | A | 1/1998 | Lawlor |
| 6,230,481 | B1 | 5/2001 | Jahr |
| 6,446,425 | B1 | 9/2002 | Lawlor |
| 7,036,318 | B1 | 5/2006 | Munson, Jr. |
| 7,506,574 | B2 | 3/2009 | Jensen et al. |
| 7,552,903 | B2 | 6/2009 | Dunn et al. |
| 7,845,413 | B2 | 12/2010 | Shampine et al. |
| 8,567,354 | B2 | 10/2013 | Kealy et al. |
| 8,621,873 | B2 | 1/2014 | Robertson et al. |
| 8,801,394 | B2 | 8/2014 | Anderson |
| 9,534,473 | B2 | 1/2017 | Morris et al. |
| 10,030,579 | B2 | 7/2018 | Austin et al. |
| 10,060,293 | B2 | 8/2018 | Del Bono |
| 10,371,012 | B2 | 8/2019 | Davis et al. |
| 10,815,764 | B1 | 10/2020 | Yeung |
| 10,865,624 | B1* | 12/2020 | Cui .................... E21B 41/0085 |
| 10,865,631 | B1* | 12/2020 | Zhang .................... F04B 17/03 |
| 10,954,770 | B1 | 3/2021 | Yeung et al. |
| 10,961,993 | B1 | 3/2021 | Ji et al. |
| 10,968,837 | B1 | 4/2021 | Yeung et al. |
| 11,111,768 | B1 | 9/2021 | Yeung et al. |
| 11,181,046 | B1 | 11/2021 | Brooks et al. |
| 11,242,737 | B2 | 2/2022 | Zhang |
| 11,499,405 | B2 | 11/2022 | Zhang |
| 11,519,395 | B2 | 12/2022 | Zhang |
| 2003/0004029 | A1 | 1/2003 | Lagarde et al. |
| 2003/0171184 | A1 | 9/2003 | Wige |
| 2004/0050049 | A1 | 3/2004 | Wendt et al. |
| 2005/0221946 | A1 | 10/2005 | Mitrovic |
| 2007/0213171 | A1 | 9/2007 | Pizzichil et al. |
| 2007/0277982 | A1 | 12/2007 | Shampine et al. |
| 2009/0068031 | A1 | 3/2009 | Gambier et al. |
| 2010/0071899 | A1 | 3/2010 | Coquilleau et al. |
| 2011/0085924 | A1 | 4/2011 | Shampine et al. |
| 2011/0171044 | A1 | 7/2011 | Flanigan |
| 2013/0112029 | A1 | 5/2013 | Slayter et al. |
| 2013/0209236 | A1 | 8/2013 | Xu |
| 2014/0144641 | A1 | 5/2014 | Chandler |
| 2014/0174717 | A1 | 6/2014 | Broussard et al. |
| 2014/0219824 | A1 | 8/2014 | Burnette |
| 2014/0274557 | A1 | 9/2014 | Chong |
| 2015/0184591 | A1 | 7/2015 | Giancotti et al. |
| 2015/0247421 | A1 | 9/2015 | Wojick et al. |
| 2015/0252661 | A1 | 9/2015 | Glass |
| 2015/0275891 | A1 | 10/2015 | Chong |
| 2015/0377318 | A1 | 12/2015 | Byrne |
| 2015/0381013 | A1 | 12/2015 | Davies et al. |
| 2016/0047305 | A1 | 2/2016 | Wickert et al. |
| 2016/0102581 | A1 | 4/2016 | Del Bono |
| 2016/0169322 | A1 | 6/2016 | Ono |
| 2016/0177678 | A1* | 6/2016 | Morris ...................... F02C 7/32 |
| | | | 60/772 |
| 2016/0218650 | A1 | 7/2016 | Gajanayake et al. |
| 2016/0230525 | A1 | 8/2016 | Lestz et al. |
| 2016/0341124 | A1 | 11/2016 | Ross et al. |
| 2016/0348479 | A1 | 12/2016 | Oehring et al. |
| 2017/0082110 | A1 | 3/2017 | Lammers |
| 2017/0089189 | A1 | 3/2017 | Norris et al. |
| 2017/0104389 | A1 | 4/2017 | Morris et al. |
| 2017/0218727 | A1 | 8/2017 | Oehring et al. |
| 2017/0234308 | A1 | 8/2017 | Buckley |
| 2017/0292789 | A1 | 10/2017 | Hjorth et al. |
| 2018/0111807 | A1 | 4/2018 | Snider |
| 2018/0266412 | A1 | 9/2018 | Stokkevag et al. |
| 2018/0283464 | A1 | 10/2018 | Altamura |
| 2019/0063309 | A1 | 2/2019 | Davis |
| 2019/0067991 | A1 | 2/2019 | Davis et al. |
| 2019/0068026 | A1 | 2/2019 | Davis |
| 2019/0178235 | A1 | 6/2019 | Coskrey et al. |
| 2019/0338762 | A1 | 11/2019 | Curry et al. |
| 2020/0040878 | A1* | 2/2020 | Morris ................ E21B 43/2607 |
| 2020/0049136 | A1 | 2/2020 | Stephenson |
| 2020/0056458 | A1 | 2/2020 | Mao et al. |
| 2020/0108364 | A1* | 4/2020 | Glass .................. B01F 35/3204 |
| 2020/0109616 | A1 | 4/2020 | Oehring et al. |
| 2020/0325761 | A1 | 10/2020 | Williams |
| 2020/0332784 | A1 | 10/2020 | Zhang et al. |
| 2020/0340344 | A1 | 10/2020 | Reckels et al. |
| 2020/0370633 | A1 | 11/2020 | Kumar |
| 2020/0392826 | A1 | 12/2020 | Cui et al. |
| 2020/0400005 | A1* | 12/2020 | Han ..................... B01F 35/7176 |
| 2021/0025383 | A1 | 1/2021 | Bodishbaugh |
| 2021/0079902 | A1 | 3/2021 | Yeung et al. |
| 2021/0102531 | A1 | 4/2021 | Bodishbaugh et al. |
| 2021/0308638 | A1* | 10/2021 | Zhong ..................... B01F 21/20 |
| 2021/0372256 | A1 | 12/2021 | Yeung et al. |
| 2021/0404309 | A1 | 12/2021 | Yeung et al. |
| 2022/0213777 | A1* | 7/2022 | Cui ..................... E21B 43/2607 |
| 2022/0307359 | A1* | 9/2022 | Liu .......................... F04B 39/02 |

FOREIGN PATENT DOCUMENTS

| | | |
|---|---|---|
| CN | 201159100 Y | 12/2008 |
| CN | 201646518 U | 11/2010 |
| CN | 201863895 U | 6/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |
| CN | 105065224 A | 11/2015 |
| CN | 205117343 U | 3/2016 |
| CN | 105545666 A | 5/2016 |
| CN | 105703535 A | 6/2016 |
| CN | 106089175 A | 11/2016 |
| CN | 107208557 A | 9/2017 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 110118127 A | 8/2019 |

(56) References Cited

FOREIGN PATENT DOCUMENTS

| CN | 110145399 | A | 8/2019 |
| CN | 110374745 | A | 10/2019 |
| CN | 110469314 | A | 11/2019 |
| CN | 110469405 | A | 11/2019 |
| CN | 110500255 | A | 11/2019 |
| CN | 110513097 | A | 11/2019 |
| CN | 209586278 | U | 11/2019 |
| CN | 209586287 | U | 11/2019 |
| CN | 110735713 | A | 1/2020 |
| CN | 110821464 | A | 2/2020 |
| CN | 210714958 | U | 6/2020 |
| CN | 111594314 | A | 8/2020 |
| CN | 112682172 | A | 4/2021 |
| FR | 2890438 | A1 | 3/2013 |
| KR | 101861753 | B1 | 5/2018 |
| WO | WO 2019/204323 | A1 | 10/2019 |

OTHER PUBLICATIONS

International Search Report, dated Jun. 5, 2020, pp. 1-4, issued in International Patent Application No. PCT/CN2019/107021, China Intellectual Property Administration, Beijing, China.
International Search Report, dated Jun. 10, 2020, pp. 1-4, issued in International Patent Application No. PCT/CN2019/107023, China Intellectual Property Administration, Beijing, China.
International Search Report, dated May 14, 2020, pp. 1-4, issued in International Patent Application No. PCT/CN2019/107026, China Intellectual Property Administration, Beijing, China.
International Search Report, dated Sep. 26, 2021, pp. 1-4, issued in International Patent Application No. PCT/CN2019/095646, China Intellectual Property Administration, Beijing, China.
Non-final Office Action mailed Apr. 6, 2023 for U.S. Appl. No. 17/886,221.
Non-final Office Action mailed Apr. 11, 2023 for U.S. Appl. No. 18/047,863.

* cited by examiner

TURBINE FRACTURING EQUIPMENT

CROSS-REFERENCE TO RELATED APPLICATIONS

The present disclosure is a continuation-in-part application of and claims the benefit of priority to U.S. patent application Ser. No. 17/531,817, filed on Nov. 22, 2021, which is a continuation of and claims the benefit of priority to U.S. patent application Ser. No. 16/832,191, filed on Mar. 27, 2020, which is based on and claims the benefit of priority to Chinese Patent Application No. 201910894253.0, filed on Sep. 20, 2019. These prior patent applications are herein incorporated by reference in their entireties.

TECHNICAL FIELD

The present invention relates to the field of operation in oil and gas fields, and specifically to a turbine fracturing equipment.

BACKGROUND

In the working sites of fracturing in oil and gas fields all over the world, the driving modes for fracturing equipment mainly include the following two ways:

One driving mode is diesel engine driven, specifically a diesel engine is connected to a transmission through a transmission shaft to drive the fracturing plunger pump to work. In other words, a diesel engine is used as the power source, a transmission and a transmission shaft are used as the transmission devices, and a fracturing plunger pump is used as the actuating element.

This configuration mode has the following disadvantages:
(1) Large volume and heavy weight: When a diesel engine drives a transmission to drive a fracturing plunger pump through a transmission shaft, a large volume is occupied, a heavy weight is involved, the transportation is restricted, and the power density is low;
(2) Environmental problems: During operations on a well site, the fracturing equipment driven by the diesel engine would generate engine waste gas pollution and noise pollution. The noise exceeding 105 dBA will severely affect the normal life of nearby residents;
(3) Cost inefficiency: The fracturing equipment driven by the diesel engine requires relatively high initial purchase costs and incurs high fuel consumption costs for unit power during operation, and the engine and the transmission also require very high routine maintenance costs.

The other driving mode is electric drive fracturing, specifically an electric motor is connected to a transmission shaft or a coupling to drive the fracturing plunger pump to work. In other words, an electric motor is used as the power source, a transmission shaft or a coupling is used as the transmission device, and a fracturing plunger pump is used as the actuating element.

Although the electric drive fracturing has many advantages itself, the power supply on fracturing well sites is the prerequisite for implementation of electric drive fracturing. Generally, it is difficult to supply power for the fracturing well sites in that the power capacity on the well sites is too small to drive the whole fracturing unit, or there are not any power networks at all on the well sites. Therefore, in common electric drive fracturing sites, generators are generally used to generate electricity. The most economical generation fuel is natural gas, but the users employing natural gas need to rent or purchase gas generator sets. For a fracturing well site without power networks, the power of the gas generator sets needs up to at least 30 MW. Purchasing such high-power gas generator sets is a great investment for customers. More importantly, in actual work progress, the accidental shutdown of the gas generator sets would cause the breakdown of the whole electric drive fracturing unit, thus seriously affecting the working quality, even causing work accidents possibly.

Therefore, there is an urgent need for a new fracturing equipment to solve the disadvantages of the above existing diesel engine-driven fracturing and electric drive fracturing, thus better satisfying the demands on the oil and gas field fracturing market globally.

SUMMARY

To overcome the deficiencies in the prior art, an objective of the present invention is to provide a turbine fracturing equipment, which adopts a linear connection of the whole equipment and a special chassis design, so that the center of gravity is double lowered to guarantee its stability and safety, the structure is simpler, the investment and operation costs are decreased, the risk of total breakdown of the fracturing site is reduced, and the equipment has a good transmission performance and is suitable for continuous operation conditions with long time and heavy load.

The objective of the present invention is achieved by the following technical measures: a turbine fracturing equipment, including a transporter, a turbine engine, a reduction gearbox, a transmission mechanism or transmitter, and a plunger pump, wherein an output end of the turbine engine is connected to one end of the reduction gearbox, the other end of the reduction gearbox is connected to the plunger pump through the transmission mechanism, the transporter is used to support the turbine engine, the reduction gearbox, the transmission mechanism and the plunger pump; the transporter includes a chassis provided with a transport section, a bearing section and a lapping section which are connected in sequence; while the turbine fracturing equipment is in a working state, the bearing section of the chassis can contact with the ground, while the turbine fracturing equipment is in a transport state, the bearing section of the chassis does not contact with the ground.

Further, the transporter includes wheels and axles, the wheels are disposed at both ends of the axles, the axles are connected to the chassis, and the number of the axles is 3 or above.

Further, the axles are disposed at the transport section of the chassis.

Further, while the turbine fracturing equipment is in the working state, the bottom of the bearing section of the chassis is at the same level as the bottom of the wheels.

Further, while the turbine fracturing equipment is in the transport state, the lapping section assists in transporting the transporter under the action of an external towing force.

Further, the bottom of the lapping section is provided with a bevel which is provided with a bulge, while the turbine fracturing equipment is in the transport state, the bevel can be used in conjunction with external towing equipment, the bulge assists in fixing the transporter and preventing the transporter from separating from the external towing equipment.

Further, the turbine engine is provided with an exhaust system on an opposite side of the reduction gearbox, the exhaust system includes an exhaust silencer and an exhaust duct, the exhaust silencer is connected to an exhaust port of the turbine engine through the exhaust duct.

Further, the exhaust system, the turbine engine, the reduction gearbox, the transmission mechanism and the plunger pump are disposed in a straight line along the transmission direction of power.

Further, the transmission mechanism is a transmission shaft or a coupling.

Further, a hydraulic power unit is disposed on the transport section, the hydraulic power unit drives the hydraulic system on the turbine fracturing equipment.

Further, the hydraulic power unit is driven by a diesel engine or driven by an electric motor.

Further, a cooling system is disposed on the transport section, the cooling system cools the oil used on the turbine fracturing equipment.

Further, the power of the plunger pump is 5000 hp or above.

Compared with the prior art, the present invention has the following beneficial effects: the turbine engine, the reduction gearbox, the transmission mechanism and the plunger pump are connected in a straight line along the transmission direction of power to avoid excessive transmission loss, thus ensuring efficient transmission performance. The turbine engine itself has the advantages of small volume, light weight and high-power density. For the same size and weight, the unit-power of a turbine fracturing equipment is more than twice that of conventional diesel fracturing equipment. The turbine engine can be fueled by 100% natural gas directly, greatly reducing the use cost compared with the diesel consumption in diesel drive and the investment on gas generator sets of electric drive fracturing equipment. Meanwhile, the turbine fracturing equipment are usually operated with the plunger pumps drived one-to-one, unlike in electric drive fracturing equipment, a single high-power gas generator set is used to drive multiple plunger pumps. That is to say, a turbine fracturing equipment is employed to distribute the failure risk of a single high-power gas generator onto each turbine fracturing equipment, avoiding that the failure of a single gas generating equipment causes the risk of breakdown of the whole set of fracturing equipment. The special chassis design of the transporter allows the center of gravity of the whole equipment is further lowered on the basis of lowering the center of gravity by a linear connection, so that the stability and safety of the whole equipment are further enhanced no matter in a transport state or in a working state.

The present invention will be described in detail below with reference to the accompanying drawings and specific implementations.

Wherein, 1. hydraulic power unit, 2. transporter, 3. exhaust silencer, 4. exhaust duct, 5. turbine engine, 6. reduction gearbox, 7. transmission mechanism, 8. plunger pump, 9. tractor, 10. bevel, 11. bulge, 12. horizontal surface, 13. slope surface, 14. diesel engine, 15. vertical support, 16. Frequency converting power supply, 17. Sand mixer, 17-1. liquid inlet/sand-liquid mixture inlet/outlet, 17-2. sand inlet of the sand mixer, 18. Sand mixing electric motor, 19. liquid inlet/sand-liquid mixture outlet pipe, 20. Liquid-sand mixture outlet port of manifold, 21 liquid inlet of manifold, 22. centrifugal pump, 23. electric motor, 24-25. Pipelines, 26. Electric pump, 27. Centrifugal pump, 28. Sand-liquid mixture outlet and manifold, 29. Liquid inlet of manifold, 30. gooseneck or lapping portion/section of semitrailer, 31. bearing portion/section of the semitrailer, and 32. transport portion/section of the semitrailer.

Description of the Embodiments

Figure 1:
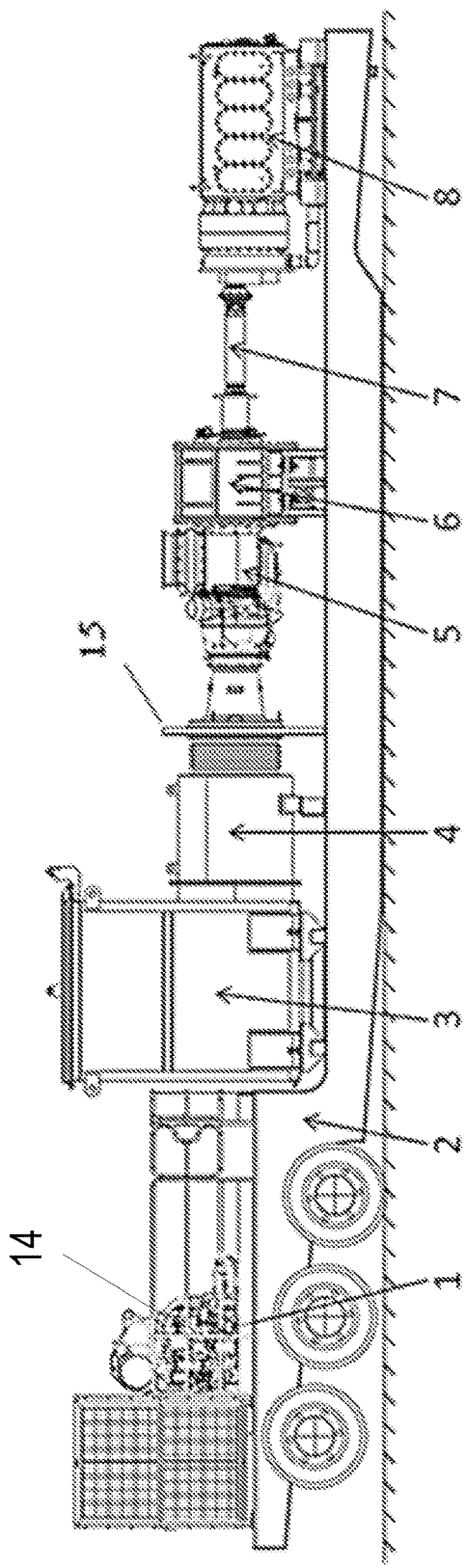
FIG. 1 is a schematic structural diagram of a turbine fracturing equipment while in a working state.
Figure 2:
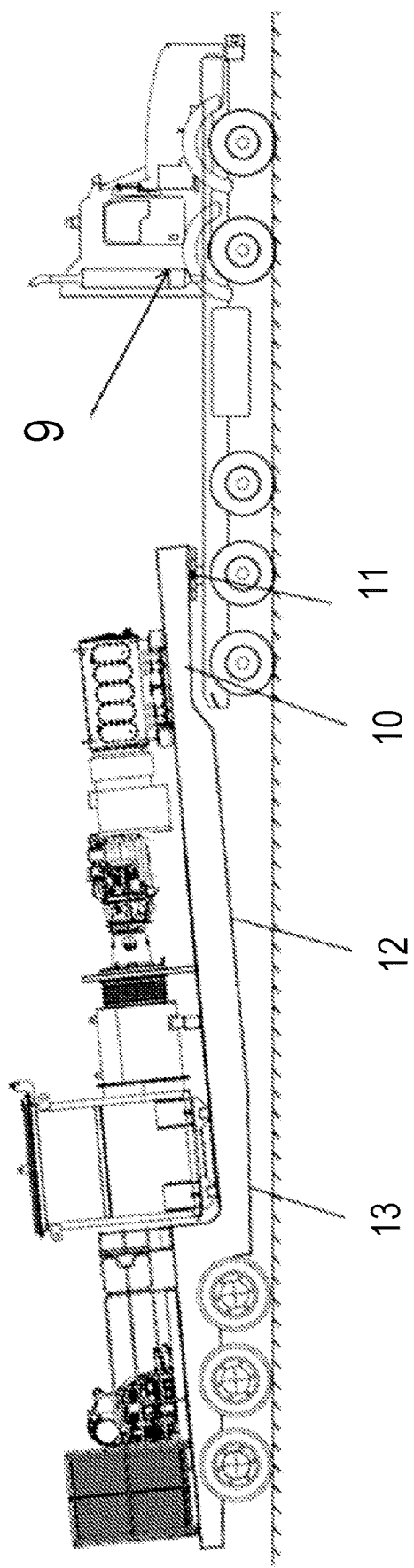
FIG. 2 is a schematic structural diagram of a turbine fracturing equipment while in a transport state.

As shown in FIGS. 1 to 2, a turbine fracturing equipment, including a transporter 2, a turbine engine 5, a reduction gearbox 6, a transmission mechanism 7 and a plunger pump 8, wherein the turbine engine 5 is the power source for the power transmission system of the whole equipment, an output end of the turbine engine 5 is connected to one end of the reduction gearbox 6, the other end of the reduction gearbox 6 is connected to the plunger pump 8 through the transmission mechanism 7; the transporter 2 is used to support the turbine engine 5, the reduction gearbox 6, the transmission mechanism 7 and the plunger pump 8; the transporter 2 includes a chassis provided with a transport section, a bearing section and a lapping section which are connected in sequence; while the turbine fracturing equipment is in a working state, the bearing section of the chassis can contact with the ground, while the turbine fracturing equipment is in a transport state, the bearing section of the chassis does not contact with the ground. The chassis is further provided with components such as battery wires, a fuel tank, a lubricating oil tank, a hydraulic oil tank and the like, providing oil and support for the up-loading components such as the turbine engine 5, the reduction gearbox 6, the plunger pump 8 and the like. The reduction gearbox 6 is used to slow down and increase the torque of the power output of the turbine engine 5, and then drives the plunger pump 8 to work through the transmission mechanism 7.

In one embodiment, as shown in FIG. 1, the turbine fracturing equipment further includes a vertical support 15 between the exhaust duct and the turbine engine, wherein the vertical support 15 stands on and in direct physical contact with a top surface of the chassis.

The transporter 2 includes wheels and axles, the wheels are disposed at both ends of the axles, the axles are connected to the chassis, and the number of the axles is 3 or above, to ensure an adequate bearing capacity.

The axles are disposed at the transport section of the chassis.

While the turbine fracturing equipment is in the working state, the bottom of the bearing section of the chassis is at the same level as the bottom of the wheels. The bottom itself of the bearing section is a horizontal surface 12 plus a slope surface 13, while in the working state, the horizontal surface 12 at the bottom of the bearing section fully contact with the ground, increasing the stability of the equipment in operations. The slope surface 13 allows the raised chassis to be lifted off the ground for easy walking when the turbine fracturing equipment is in a transport state.

While the turbine fracturing equipment is in the transport state, the lapping section assists in transporting the transporter 2 under the action of an external towing force.

The bottom of the lapping section is provided with a bevel 10 which is provided with a bulge 11. While the turbine fracturing equipment is in the transport state, the bevel 10 can be used in conjunction with external towing equipment, the bulge 11 assists in fixing the transporter 2 and preventing the transporter 2 from separating from the external towing equipment. The external towing equipment may be a tractor 9 and the like, and the bulge may be a traction pin.

The turbine engine 5 is provided with an exhaust system on an opposite side of the reduction gearbox 6. The exhaust system includes an exhaust silencer 3 and an exhaust duct 4, the exhaust silencer 3 is connected to an exhaust port of the turbine engine 5 through the exhaust duct 4. The exhaust duct 4 is used to direct the exhaust of the turbine engine 5 into the exhaust silencer 3, which can reduce the noise of the exhaust.

The exhaust system, the turbine engine 5, the reduction gearbox 6, the transmission mechanism 7 and the plunger pump 8 are disposed in a straight line along the transmission direction of power. The linear connection of the turbine engine 5, the reduction gearbox 6, the transmission mechanism 7 and the plunger pump 8 along the transmission direction of power can avoid excessive transmission loss, thus ensuring efficient transmission performance. The turbine engine 5 itself has the advantages of small volume, light weight and high power density. For the same size and weight, the unit-power of a turbine fracturing equipment is more than twice that of conventional diesel fracturing equipment. The turbine engine 5 can be fueled by 100% natural gas directly, greatly reducing the use cost compared with the diesel consumption in diesel drive and the investment on gas generator sets of electric drive fracturing equipment. Of course, the turbine engine 5 can also use 100% fuel oil as the fuel, preferably natural gas, which can reduce more fuel costs than fuel oil. Meanwhile, the turbine fracturing equipment are usually operated with the plunger pump 8 drived one-to-one, unlike in electric drive fracturing equipment, a single high-power gas generator set is used to drive multiple plunger pumps. That is to say, a turbine fracturing equipment is employed to distribute the failure risk of a single high-power gas generator onto each turbine fracturing equipment, avoiding that the failure of a single gas generating equipment causes the risk of breakdown of the whole set of fracturing equipment.

The transmission mechanism 7 is a transmission shaft or a coupling.

A hydraulic power unit 1 is disposed on the transport section, the hydraulic power unit 1 is used to drive the hydraulic system on the turbine fracturing equipment. The hydraulic system includes a hydraulic pump, a hydraulic motor, various valves, a hydraulic oil tank, a hydraulic oil radiator, and the like, (the hydraulic system is mainly used to drive the fuel pump of the turbine engine 5, the starting motor of the turbine engine 5, the lubrication system at the power end of the plunger pump 8, the lubrication system of the reduction gearbox 6, and various oil radiators, and the like).

The hydraulic power unit 1 is driven by a diesel engine or driven by an electric motor.

A cooling system is disposed on the transport section, the cooling system cools the oil used on the turbine fracturing equipment. The oil used includes the engine oil for the turbine engine 5, hydraulic oil, the lubricating oil for the plunger pump 8, the lubricating oil for the reduction gearbox 6, and the like.

The power of the plunger pump 8 may be rated at 5000 hp or above, the higher the power of the plunger pump 8 is, the more suitable for lone-time and high-load continuous operation conditions.

The plunger pump 8 may be configured to generate high pressure sand-liquid mixture, alternatively referred to as fracturing fluid for delivery to a wellhead. In some example implementations, the sand-liquid mixture may be delivered by a pipeline to the plunger pump from a sand-liquid mixing system. Such a sand-liquid mixing system may be disposed on a separate platform, e.g., another semitrailer.

Figure 3:
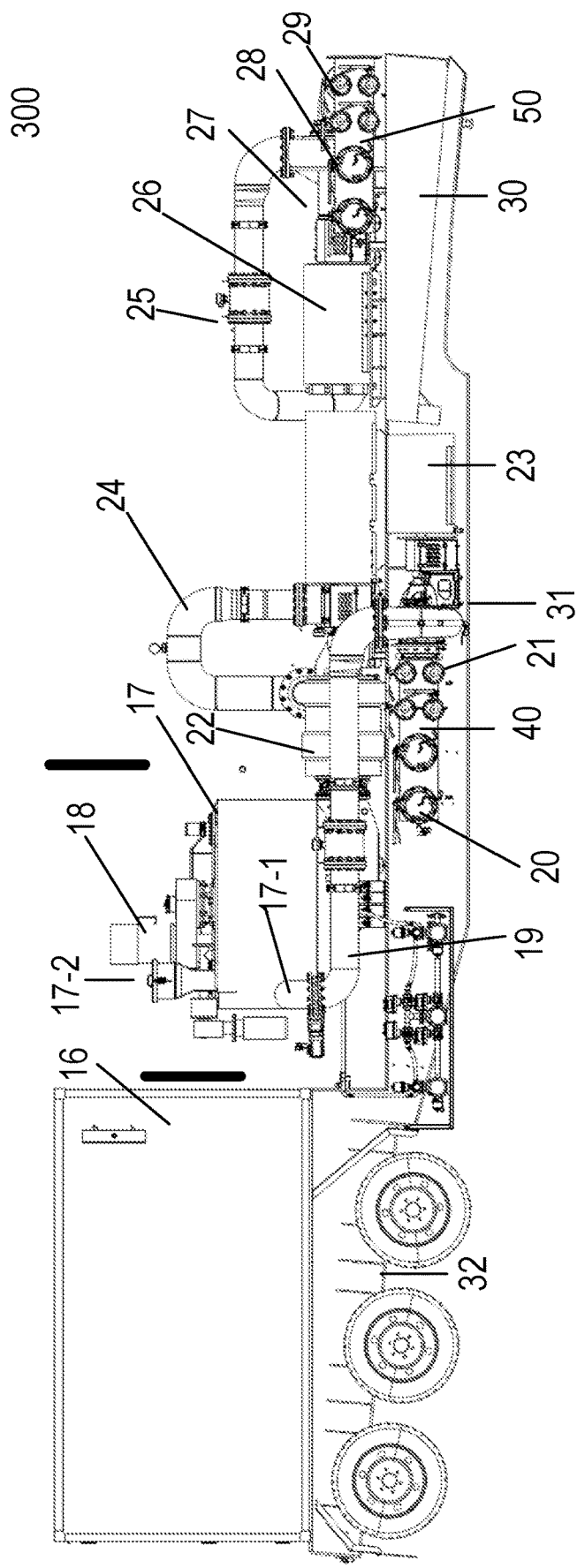
FIG. 3 shows an example sand mixing system disposed on a semitrailer for supplying sand-liquid mixture to a plunger pump.

One example of such a sand-liquid mixing system 300 disposed on a semitrailer is shown in FIG. 3. The example sand-liquid mixing system 300 may include a sand-liquid mixer 17 which may contain an agitator therein driven by, for example, an electric motor 18. The sand-liquid mixer 17 may receive sand from a sand inlet 17-2 as delivered, for example, from a separate sand conveyer system. The sand-liquid mixer 17 may further receive a liquid (e.g., base fluid such as water or oil, with proppant and chemical additives) from a liquid inlet 17-1. The intake sand and liquid from these inlets may then be mixed in the sand mixer by the agitator driven by the electric motor 18.

The intaking liquid and the sand-liquid mixture may be transported via pipelines 24 and in either one of two directions to either (1) one or more sand-liquid mixture outlets 20 of a first manifold 40 or (2) one or more sand-liquid mixture outlets 28 of a second manifold 50.

The liquid may be delivered from either (1) one or more liquid inlets 29 of the second manifold 50 or (2) one or more liquid inlets 21 of the first manifold 40. The suction for intaking the liquid from these inlets may be created by centrifugal pumps 22 and/or 27, driven by electric motor 23 or electric motor 26 respectively.

As such, the sand-liquid mixing system 300 may be configured to operate in a first direction, where it intakes the liquid from the liquid inlet 21 of the first manifold 40, mixes the liquid with the sand in the liquid-sand mixer 17 and delivers the sand-liquid mixture via the pipelines 24 and 25 to the one or more sand-liquid mixture outlets 28 of the second manifold 50. Alternatively, the sand-liquid mixing system 300 may be configured to operate in a second opposite direction, where it intakes the liquid from one or more liquid inlets 29 of the second manifold 50, transports the liquid to the sand-liquid mixer 17 for mixing the liquid with the sand and delivers the sand-liquid mixture to the one or more sand-liquid mixture outlets 20 of the first manifold 40.

The sand-liquid mixing system 300 may operate in either one of the two directions and in each operation model, one or both of the electric motors 23 and 26 may operate to drive the centrifugal pumps 22 or 27 for pushing or pulling the liquid into the sand-liquid mixer 17 and for pushing or pulling the sand-liquid mixture to the outlets. For example, the sand-liquid system 300 may operate in the first direction with only the electric motor 23 driving the centrifugal pump 22, with only the electric motor 26 driving the centrifugal pump 27, or with both the electric motors 23 and 26 driving the centrifugal pumps 22 and 27. For another example, the sand-liquid system 300 may operate in the second direction with only the electric motor 26 driving the centrifugal pump 27, with only the electric motor 23 driving the centrifugal pump 22, or with both the electric motors 23 and 26 driving the centrifugal pumps 22 and 27. Operating both electric motors may provide a push of the liquid into the mixer and pull of the sand-liquid mixture from the mixer at the same time, generating higher throughput.

To switch between the two directions the electric motors 23 and/or 26 may be controlled to reverse their rotational direction. Alternatively, gear systems may be controlled to switch the direction the centrifugal pumps operate.

The electric motors above, including the electric motors 18, 23 and 26, may be configured in a variable frequency driving mode, as a type of AC motors, where the rotational speeds of the motors are determined by the drive frequency. Accordingly, the sand-liquid mixing system 300 may include a variable frequency power supply 16 with controllers, and with electric drive connection with the motors 18, 23, and 26, and configured to generate variable frequency driving power to control the rotational speeds of the motors, thereby controlling the throughput of the sand-liquid mixing system 300.

The various components in the sand-liquid mixing system 300 of FIG. 3 may be grouped in to several different groups. For example, a first group may include at least the variable frequency power supply 16; a second group may include at least the sand-liquid mixer 17 with the mixing electric motor 18 and the sand inlet 17-2; and a third group may include at least components for liquid intake and for a delivery of sand-liquid mixture including the manifolds and 50, the pipelines 24 and 25, the centrifugal pumps 22 and 27, and the electric motors 23 and 26. These example groups are delineated by, for example, the thick lines shown in FIG. 3.

The weight of the various components may be taken into consideration in determining the example grouping above. The groups of components may then be distributively disposed on different portions of the semitrailer with their weights taking into consideration for adequate support and balancing. In the example of FIG. 3, the semitrailer acting as a platform for the sand-liquid mixing system 300 may include a gooseneck or lapping section 30 that may be attached to a truck head for transporting. The semitrailer may also include a middle bearing section 31, and further include a transport section 32 where a plurality of wheels and axels are located. Further in the example of FIG. 3, the first group of components are disposed over the transport section 32, the second group of components are disposed over a portion of the bearing section 21, whereas the third group of components are the disposed over both a portion of the bearing section 31 and the entire gooseneck/lapping section 30.

Figure 4:
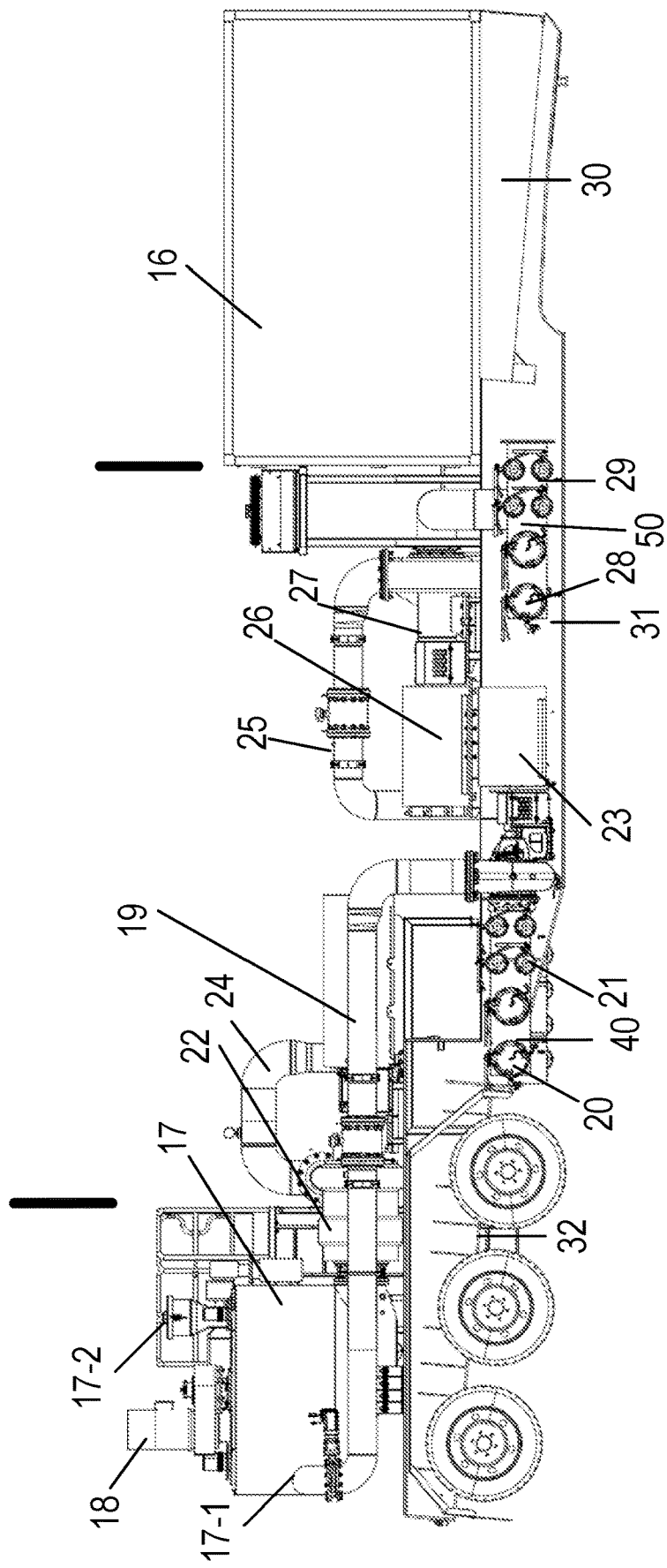
FIG. 4 shows another example sand mixing system disposed on a semitrailer for supplying sand-liquid mixture to a plunger pump.

Another example sand-liquid mixing system 400 disposed on a semitrailer is shown in FIG. 4. The system 400 is similar to system 300 with the various example components similarly labeled. In the example system 400, however, the different groups of components are distributed differently over the various portions of the semitrailer. For example, as shown in FIG. 4, the first group of components are disposed over the gooseneck/lapping section 30 of the semitrailer, the second group of components are disposed over the transport section 32 of the semitrailer, whereas the third section of components are disposed over the bearing section 31 of the semitrailer. The delineation of the different groups of components, again, are shown by the thick lines.

Figure 5:
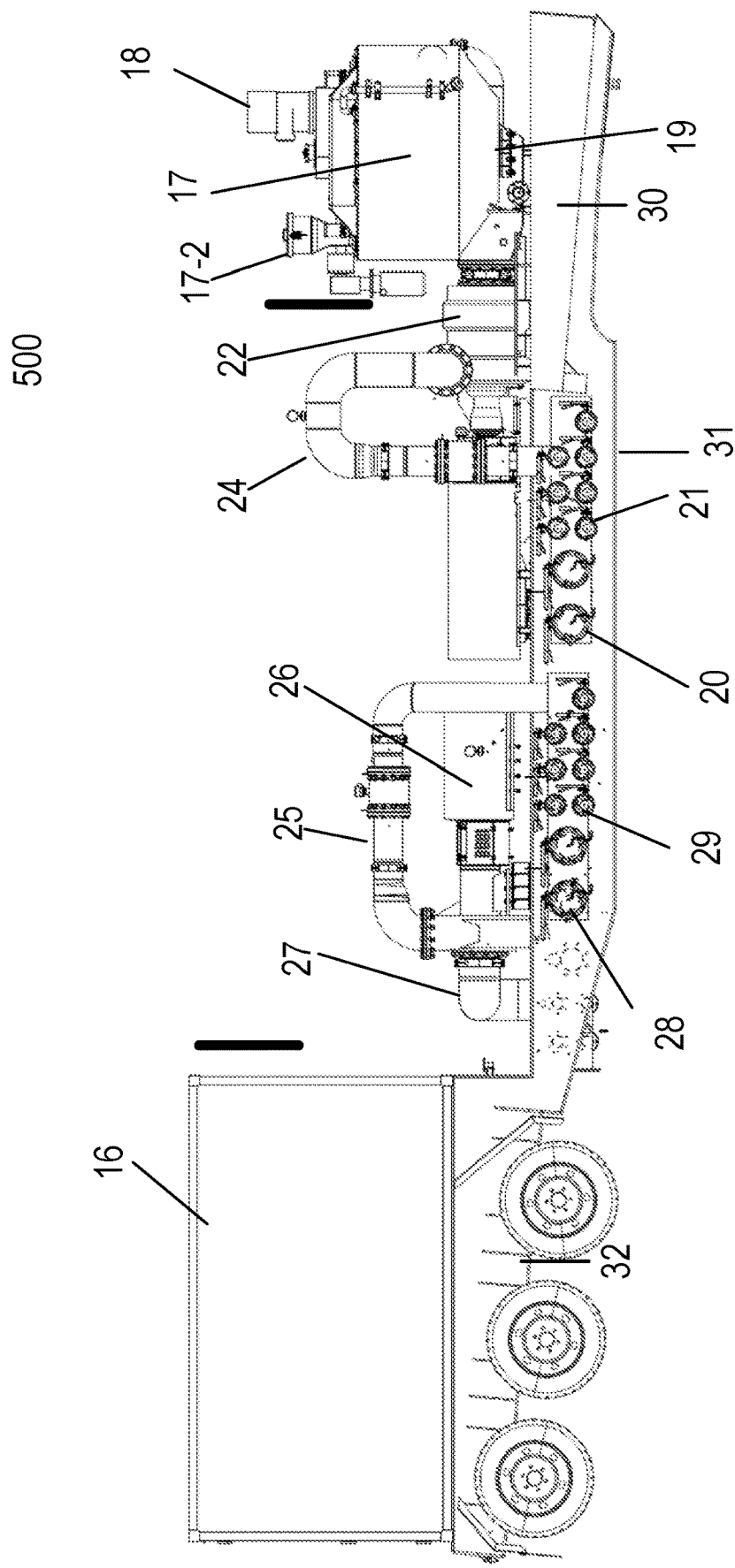
FIG. 5 shows yet another example sand mixing system disposed on a semitrailer for supplying sand-liquid mixture to a plunger pump.

Similar, yet another example sand-liquid mixing system 500 disposed on a semitrailer is shown in FIG. 5. The system 500 is similar to system 300 and system 400 with the various example components similarly labeled. In example system 500, however, the different groups of components are distributed differently over the various portions of the semitrailer. For example, as shown in FIG. 5, the first group of components are disposed over the transport section 32 of the semitrailer, the second group of components are disposed over the gooseneck/lapping section 30 of the semitrailer, whereas the third section of components are disposed over the bearing section 31 of the semitrailer. The delineation of the different groups of components, again, are shown by the thick lines.

The geometric configuration of the various portions of the semitrailers in FIGS. 3-5 relative to the ground and therebetween may be similar to that of FIGS. 1 and 2, and as described above.

The components of the sand-liquid mixing system 300, 400, and 500 may be reconfigurable in a manner that they may be easily segregated and reconfigured into one of the three or other arrangements according to FIGS. 3-5, so as to conveniently configure these groups of components relative to other system at a fracturing operation site (e.g., relative to the location of the plunger pump).

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:
1. A fracturing system, comprising:
a first transporter;
first group of components comprising at least a variable frequency electric drive power source, the first group of components being disposed on a first portion of the first transporter;
a second group of components comprising at least a sand-liquid mixer and a first electric motor for driving the sand-liquid mixer, the second group of components being disposed over a second portion of the first transporter; and
a third group of components comprising at least a pipeline system, two manifolds for intaking a liquid and for outputting a sand-liquid mixture, and two pairs of electric motor and centrifugal pump for driving the liquid into the sand-liquid mixer and for pushing the sand-liquid mixture from the sand-liquid mixer to a sand-liquid outlet of the two manifolds, the third group of components being disposed over a third portion of the first transporter, and the two pairs of electric motor and centrifugal pump being respectively disposed on an input side and an output side of the sand-liquid mixer,
wherein the variable frequency electric drive power source is configured to electrically drive the first electric motor and the two pairs of electric motor and centrifugal pump, and the sand-liquid mixer, the two pairs of electric motor and centrifugal pump, and the two manifolds are configured to operate in either one of two directions for transferring the sand-liquid mixture.
2. The fracturing system of claim 1, wherein the second group of components further comprises a sand inlet for delivering sand into the sand-liquid mixer.
3. The fracturing system of claim 1, wherein when being configured to operate in one of the two directions, only one of the two pairs of electric motor and centrifugal pump is set in operation.

4. The fracturing system of claim 1, wherein when being configured to operate in one of the two directions, both of the two pairs of electric motor and centrifugal pump are set in operation.

5. The fracturing system of claim 1, wherein the first transporter comprises a semitrailer.

6. The fracturing system of claim 5, wherein the semitrailer comprises:
a lapping section for connection to a truck head for transport;
a transport section for disposing a plurality of wheels and axels; and
a bearing section in between the lapping section and the transport section.

7. The fracturing system of claim 6, wherein:
the first group of components are disposed over the transporting section;
the second group of components are disposed over a first portion of the bearing section; and
the third group of components are disposed over a second portion of the bearing section and the lapping section.

8. The fracturing system of claim 6, wherein:
the first group of components are disposed over the lapping section;
the second group of components are disposed over the transport section; and
the third group of components are disposed over the bearing section.

9. The fracturing system of claim 6, wherein:
the first group of components are disposed over the transport section;
the second group of components are disposed over lapping section; and
the third group of components are disposed over the bearing section.

10. The fracturing system of claim 6, wherein a bottom of the bearing section is configured to support the semitrailer when the semitrailer is not in transport.

11. The fracturing system of claim 10, wherein the bottom of the lapping section is provided with a bevel.

12. The fracturing system of claim 1, further comprising a second transporter for carrying:
a turbine engine, a reduction gearbox, a transmitter and a plunger pump, wherein an output end of the turbine engine is connected to one end of the reduction gearbox, another end of the reduction gearbox is connected to the plunger pump through the transmitter; the second transporter is configured to support the turbine engine, the reduction gearbox, the transmitter and the plunger pump,
wherein the plunger pump is configured to receive the sand-liquid mixture from the first transporter.

13. The fracturing system of claim 12, wherein an exhaust system is located on an end of the turbine engine opposite to the output end of the turbine engine connected to the reduction gearbox, the exhaust system comprises an exhaust silencer and an exhaust duct, the exhaust silencer is connected to an exhaust port of the turbine engine through the exhaust duct.

14. The fracturing system of claim 13, wherein the exhaust system, the turbine engine, the reduction gearbox, the transmitter and the plunger pump are disposed in a same straight line along an axial transmission direction.

15. The fracturing system of claim 12, wherein a hydraulic power source is disposed on the second transporter, the hydraulic power source is configured to drive a hydraulic system on the second transporter.

16. The fracturing system of claim 15, wherein the hydraulic power source is a diesel engine or an electric motor.

17. The fracturing system of claim 15, wherein a cooling system is disposed on the second transporter, the cooling system being configured to cool oil used on the second transporter.

18. The fracturing system of claim 12, wherein a power of the plunger pump is rated at 5000 hp.

* * * * *